United States Patent
Kitamura et al.

(10) Patent No.: US 8,510,822 B2
(45) Date of Patent: Aug. 13, 2013

(54) COMMUNICATION SYSTEM, RELIABLE COMMUNICATION MECHANISM, AND COMMUNICATION METHOD USED FOR THE SAME

(75) Inventors: Hiroshi Kitamura, Tokyo (JP); Shigeyoshi Shima, Tokyo (JP)

(73) Assignee: NEC Corporation, Tokyo (JP)

( * ) Notice: Subject to any disclaimer, the term of this patent is extended or adjusted under 35 U.S.C. 154(b) by 923 days.

(21) Appl. No.: 12/530,440

(22) PCT Filed: Mar. 7, 2008

(86) PCT No.: PCT/JP2008/000484
§ 371 (c)(1),
(2), (4) Date: Dec. 2, 2009

(87) PCT Pub. No.: WO2008/123015
PCT Pub. Date: Oct. 16, 2008

(65) Prior Publication Data
US 2010/0107237 A1    Apr. 29, 2010

(30) Foreign Application Priority Data
Mar. 8, 2007    (JP) .................................. 2007-058018

(51) Int. Cl.
*H04L 29/06*    (2006.01)

(52) U.S. Cl.
USPC .......................................................... 726/12

(58) Field of Classification Search
None
See application file for complete search history.

(56) References Cited

U.S. PATENT DOCUMENTS

| | | | |
|---|---|---|---|
| 5,761,309 A | 6/1998 | Ohashi et al. | |
| 7,562,384 B1 * | 7/2009 | Huang | 726/5 |
| 7,840,699 B2 * | 11/2010 | Fujita et al. | 709/238 |
| 7,962,122 B2 * | 6/2011 | Nikander et al. | 455/411 |
| 7,991,913 B2 * | 8/2011 | Yan et al. | 709/245 |
| 7,995,994 B2 * | 8/2011 | Khetawat et al. | 455/410 |
| 8,005,981 B2 * | 8/2011 | Tuck et al. | 709/238 |
| 8,023,958 B2 * | 9/2011 | Wang et al. | 455/456.1 |
| 8,060,084 B2 * | 11/2011 | Buckley et al. | 455/432.1 |
| 2004/0215707 A1 * | 10/2004 | Fujita et al. | 709/201 |
| 2004/0242238 A1 * | 12/2004 | Wang et al. | 455/456.1 |
| 2004/0249975 A1 * | 12/2004 | Tuck et al. | 709/245 |

(Continued)

FOREIGN PATENT DOCUMENTS

| | | |
|---|---|---|
| JP | 2004-078280 A | 3/2004 |
| JP | 2004-248185 A | 9/2004 |

(Continued)

*Primary Examiner* — Oscar Louie
(74) *Attorney, Agent, or Firm* — Sughrue Mion, PLLC

(57) ABSTRACT

Provided is a communication system capable of fundamentally preventing an attack from an unspecified counterpart and resolve problem even when a problem occurs in a user terminal or client and a server. A mediation server (1) receives an attack from an outside source on behalf of a server (34) (server A), redirects and receives communication addressed to a node-representative ID, and performs first authentication for the communication. In the case of a reliable user terminal or client (42) (client B), the mediation server (1) provides the device with an intermediary server ID specifying an intermediary server (2). The intermediary server (2) performs second authentication for the user terminal or client (42) (client B) going through the mediation server (1). When it is identified that the user terminal or client (42) (client B) is reliable, the intermediary server (2) asks the server (34) (server A) about an ID and provides the user terminal or client (42) (client B) with traceable ID information acquired from the server (34) (server A).

4 Claims, 14 Drawing Sheets

(56) References Cited

U.S. PATENT DOCUMENTS

| | | | |
|---|---|---|---|
| 2006/0245392 A1* | 11/2006 | Buckley et al. | 370/331 |
| 2006/0293973 A1* | 12/2006 | Shuster et al. | 705/26 |
| 2007/0186000 A1* | 8/2007 | Nikander et al. | 709/228 |
| 2008/0076386 A1* | 3/2008 | Khetawat et al. | 455/410 |
| 2008/0320111 A1* | 12/2008 | Yan et al. | 709/220 |

FOREIGN PATENT DOCUMENTS

| | | |
|---|---|---|
| JP | 2004-248198 A | 9/2004 |
| JP | 2005-328373 A | 11/2005 |
| JP | 2006-050081 A | 2/2006 |
| JP | 2006-268141 A | 10/2006 |
| WO | 96/07256 A1 | 3/1996 |

* cited by examiner

COMMUNICATION SYSTEM, RELIABLE COMMUNICATION MECHANISM, AND COMMUNICATION METHOD USED FOR THE SAME

CROSS REFERENCE TO RELATED APPLICATIONS

This application is a National Stage of International Application No. PCT/JP2008/000484 filed Mar. 7, 2008, claiming priority based on Japanese Patent Application No. 2007-058018 filed Mar. 8, 2007, the contents of all of which are incorporated herein by reference in their entirety.

TECHNICAL FIELD

The present invention relates to a communication system, a reliable communication mechanism, and a communication method used for the same, and in particular, to a communication method for defending against an attack, unauthorized access or the like in a communication system including a reliable client and a server.

BACKGROUND ART

Recently, a dispute has erupted over computer viruses or SPAM mail, spyware, phishing fraud, or one-click (or two-click) fraud in Internet communication. In Internet communication, a DoS (Denial of Service) or attack (unauthorized access) from an unspecified counterpart becomes a threat to a server that transmits information such as contents or the like. Also in public telephone networks or IP (Internet Protocol) telephone networks, phone calls for money transfer fraud, SPAM, or phishing fraud or the like occur in addition to conventional malicious phone calls or silent phone calls.

For this reason, as a function required for a phone or a phone book, there is needed a function of denying a response to others except a reliable counterpart, that is, a function of denying the reception of a malicious call or money transfer fraud call in the case of call reception. To avoid the above-described problem, a caller number display function is reliable identity verification for a caller as a function in the case of call reception/transmission. In the case of call reception, there is a method by which an intermediary contact person is allowed to make contact after first receiving a phone call from an unknown counterpart. In the case of call reception/transmission, there is a method of notifying only reliable partners of a telephone number without loading the telephone number into a public telephone book.

In the designation of the communication destination of transmission, the designation is made using information from a local telephone book or a reliable telephone book service. There may be considered a method in which the guidance of an invalid number is provided in the case of call transmission, or conversation with the other party is made after connecting a phone call to a secretary instead of oneself upon call transmission. In this regard, the caller identity becomes clear in the case of call transmission, but there is a problem in that a desired state (location privacy) for preventing others from learning a calling location is not achieved.

On the other hand, as a coping strategy to protect the security of a site even on the Internet, there is a strategy using NAT (Network Address Translation) or a coping strategy at a site border such as DMZ (DeMilitarized Zone), Firewall or the like. For example, this type of coping strategy is disclosed in Patent Document 1 (JP-A-2004-248185), Patent Document 2 (JP-A-2004-248198), and Patent Document 3 (JP-A-2006-050081).

In this case, when an attack has occurred, there will be a reaction such as the case where a common user may not be able to access a site. In terms of recovery/measure when the attack has occurred, recovery is not possible as long as a fundamental measure against the attack is not provided. In terms of access to a site server and a waiting method, there is a weakness in that the possibility of undergoing an attack is high since always wait for all counterparts using the same single fixed address.
[Patent Document 1] JP-A-2004-248185
[Patent Document 2] JP-A-2004-248198
[Patent Document 3] JP-A-2006-050081

DISCLOSURE OF THE INVENTION

Problem that the Invention is to Solve

The conventional communication system described above has a problem in that a site or terminal may not be fundamentally protected from the above-described risk of an attack or unauthorized access upon reception (global access). When the above-described problem has occurred, there is another problem in that conventional communication is affected.

In view of the above, an object of the present invention is to provide a communication system, a reliable communication mechanism, and a communication method used for the same, which are able to prevent an attack from an unspecified counterpart to a user terminal, a client, or a server.

Means for Solving the Problem

According to the present invention, there is provided a communication system comprising: a mediation server which first receives, when access from a user terminal to a server is generated, the access on behalf of said server, and performs first authentication for the user terminal; and an intermediary server which performs second authentication for the user terminal identified as a reliable terminal in said first authentication by said mediation server, wherein the access from the user terminal identified as a reliable terminal in said second authentication by said intermediary server is passed to said server.

According to the present invention, there is provided a reliable communication mechanism comprising: a mediation server which first receives, when access from a user terminal to a server is generated, the access on behalf of said server, and performs first authentication for the user terminal; and an intermediary server which performs second authentication for the user terminal identified as a reliable terminal in said first authentication by said mediation server, wherein the access from the user terminal identified as a reliable terminal in said second authentication by said intermediary server is passed to said server.

According to the present invention, there is provided a communication method comprising: first receiving, by a mediation server, when access from a user terminal to a server is generated, the access on behalf of said server, and performs first authentication for the user terminal; and performing, by an intermediary server, second authentication for the user terminal identified as a reliable terminal in said first authentication by said mediation server, wherein the access from the user terminal identified as a reliable terminal in said second authentication by said intermediary server is passed to said server.

That is, the communication system of the present invention may protect the server from an attack by performing authentication by the mediation server (moderator) for access from the user terminal or client and performing authentication by the intermediary server (broker) for the user terminal or client identified as reliable by the authentication. In the communication system of the present invention, the intermediary server performs authentication for the server as well as authentication for the user terminal or client, so that access from the reliable user terminal or client to the reliable server may be realized.

The mediation server is a device, disposed to first receive an attack from an outside source on behalf of the server, which receives and redirects communication addressed to a node-representative ID (identification information such as an IP address or the like) used to access the server, performs the first authentication for the communication (for example, authentication of a source address or the like), and provides a device with intermediary server ID information specifying the intermediary server when the terminal issuing an access request is identified as the reliable user terminal or client. In this case, the mediation server notifies the intermediary server of the fact that access to the node-representative ID exists.

The intermediary server performs the second authentication for the user terminal or client going through authentication by the mediation server (for example, authentication of whether a signal is received from a specific site). In this case, the intermediary server performs authentication for the user terminal or client, authentication for the server, and other security checks by authenticating a physical line or a subscriber line between the user terminal or client and the server.

The intermediary server receives a request from the user terminal or client, asks the server about ID information, and provides the user terminal or client with traceable ID (Traceable Private ID) information acquired from the server. A security gateway of the server side verifies access to the server by a traceable ID. The traceable ID may be a fixed IP address or a dynamic IP address and may be corresponded to the user terminal or client accessing the server, thereby specifying a transmission source only by a destination address.

As such, in the communication system of the present invention, the mediation server receives and redirects, or blocks, communication addressed to a node-representative ID, and the intermediary server intermediates a trust relationship to provide only reliable counterparts with traceable ID information, thereby fundamentally preventing an attack from an unspecified counterpart without dealing with a problem after the problem occurs in the client or server.

The communication system of the present invention may fundamentally solve the above problem by replacing the mediation server with a mediation server having another node-representative ID even when a DoS (Denial of Service) attack for the server occurs.

As described above, the reliable communication mechanism has the following characteristics:

(a) reception: a trust relationship is mediated by the intermediary server, (b) reception/transmission: a traceable ID is used (a transmission source may be specified only by a destination address), (c) reception: communication addressed to the node-representative ID is received, redirected, or blocked by the mediation server, (d) transmission/reception: a reliable community to collect information is formed by the intermediary server, (e) transmission: traceable ID information is provided only to reliable counterparts using a reliable communication mechanism through the intermediary server, (f) transmission: an invalid traceable ID is reported, (g) transmission: proxy resolving of a traceable ID is connected by a security gateway of a local site, and (h) transmission: a local area is protected by a node-representative ID and a counterpart is specified by a traceable ID.

Advantage of the Invention

According to the above-described configuration and operation, the present invention may fundamentally prevent an attack from an unspecified counterpart to a user terminal, client, or server.

BEST MODE FOR CARRYING OUT THE INVENTION

Next, embodiments of the present invention will be described with the drawings.

First Embodiment

Figure 1:
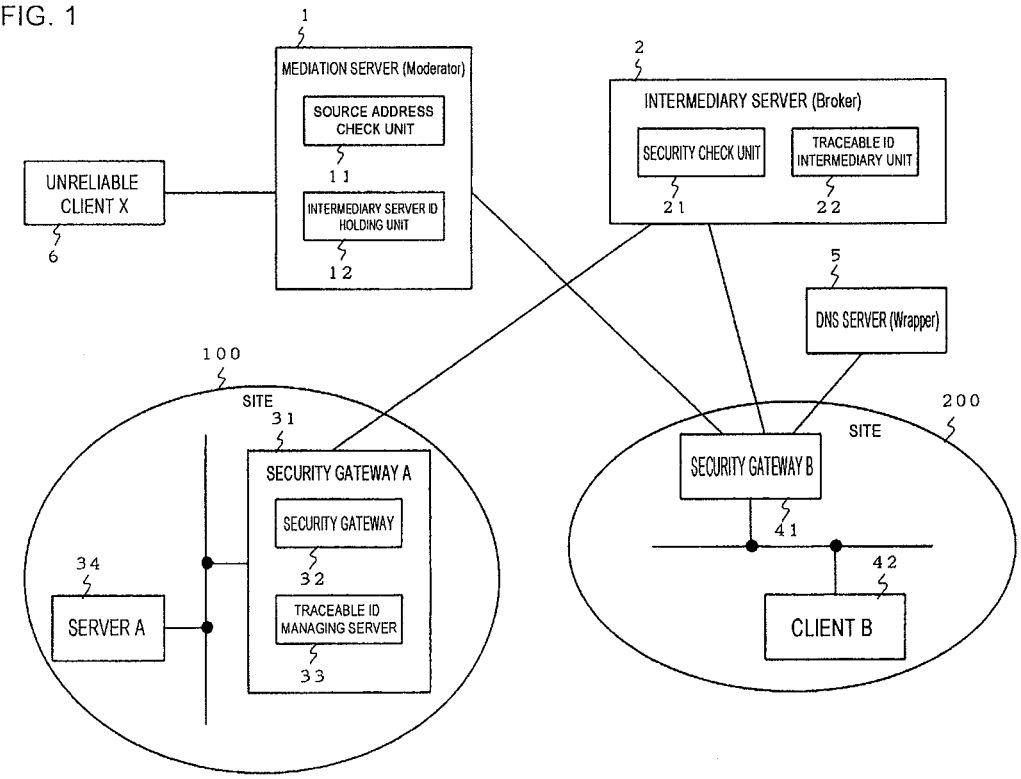
FIG. 1 is a block diagram showing a configuration of a communication system according to a first embodiment of the present invention.

FIG. 1 is a block diagram showing a configuration of a communication system according to a first embodiment of the present invention. In FIG. 1, the communication system according to the first embodiment of the present invention includes a reliable communication mechanism constituted by a mediation server (moderator) 1, an intermediary server (broker) 2, and security gateways 31 and 41 (security gateways A and B). The communication system further includes a server 34 (server A) and a client 42 (client B) within the same sites 100 and 200 as those of the security gateways 31 and 41 (security gateways A and B), and a DNS (Domain Name System) server 5.

The mediation server 1 is a device which first receives an attack from an unreliable client 6 (client X) on behalf of the server 34 (server A) and includes a source address check unit 11 and an intermediary server ID holding unit 12.

When communication to address information (NID_IP) retrieved and obtained, that is, resolved, by the DNS server 5 on the basis of NID_FQDN (Fully-Qualified Domain Name) as a node-representative ID is received, the mediation server 1 redirects the communication, and first authenticates the communication by the source address check unit 11. When a terminal issuing an access request is identified as a reliable user terminal, the mediation server 1 provides the user terminal with intermediary server ID information of the intermediary server ID holding unit 12 and notifies the intermediary server 2 of the fact that access to the node-representative ID exists.

For example, the source address check unit 11 checks a source address of communication to the address information (NID_IP), a connection for the communication is denied when the source address is out of a given address range set in advance, and the intermediary server ID information of the intermediary server ID holding unit 12 is provided when the source address is in the given address range. As the first authentication, an identification method other than the source address check method is applicable.

Here, the node-representative ID is an ID to be used to access the server 34 (server A), which is permanent information (NID_FQDN) in published information and is corresponded to the address information (NID_IP) (that is, an address differing according to differing of the mediation server 1) and managed by the DNS server 5. The intermediary server ID is an ID indicating a position where a traceable ID is acquired. The traceable ID is an ID (that is, a fixed address or dynamic address) assigned to each communication counterpart and may be received from the intermediary server 2 through a secure path.

The intermediary server 2 is a device that performs the second authentication for the client 42 (client B) authenticated by the mediation server 1 or the unreliable client 6 (client X), and includes the security check unit 21 and the traceable ID intermediary unit 22. The second identity check by the security check unit 21, for example, the authentication or security check for the server 34 (server A) and the client 42 (client B), may be performed by authenticating whether a subscriber line of the server 34 (server A) and the client 42 (client B) is a reliable path (a communication path of which security is identified) or whether the server 34 (server A) and the client 42 (client B) belong to the reliable sites 100 and 200. Whether the subscriber line is the reliable path may be checked on the basis of a switching center accommodating the subscriber line from the server 34 (server A) and the client 42 (client B).

The intermediary server 2 receives a request of the client 42 (client B) by the traceable ID intermediary unit 22, asks the server 34 (server A) about a traceable ID, and provides the client 42 (client B) with traceable ID information acquired from the server 34 (server A). When the security for the above-described unreliable client 6 (client X) has been checked, the intermediary server 2 determines that the client 6 does not belong to the reliable sites 100 and 200, thereby denying the access from the client 6.

The security gateway 31 (security gateway A) is a device that verifies access to the server 34 (server A) through the reliable path established with the intermediary server 2 using the traceable ID, and includes the security gateway 32 and the traceable ID managing server 33. The security gateways 31 and 41 (security gateways A and B) close a path other than a reliable path established with the intermediary server 2, for example, a VPN (Virtual Private Network) by a tunnel in the IPsec (IP security protocol) or a dedicated line.

Figure 2:
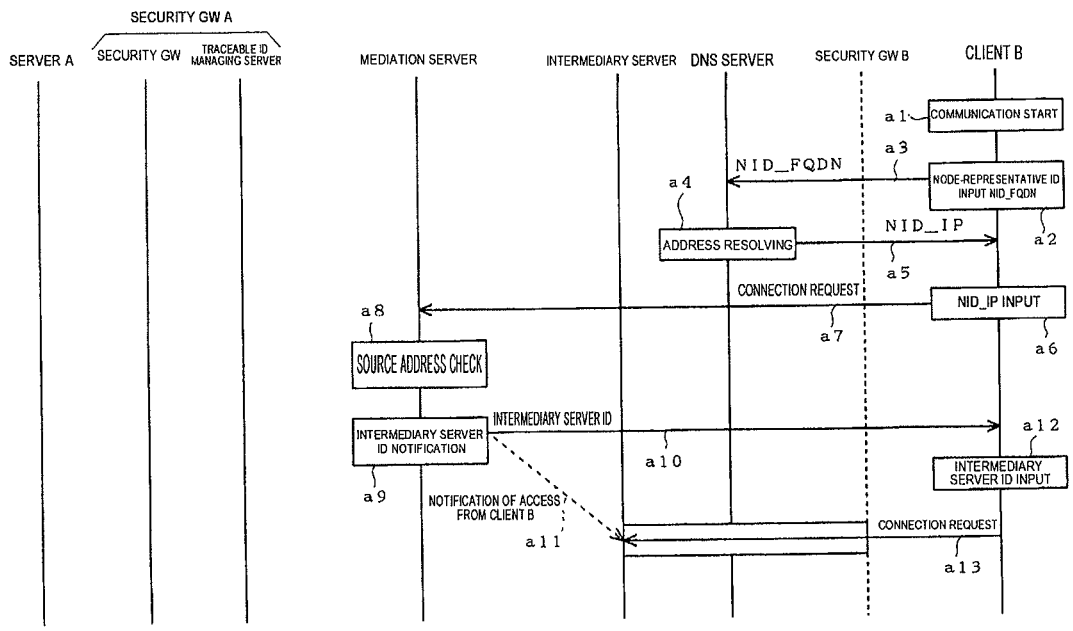
FIG. 2 is a sequence chart showing an operation of the communication system according to the first embodiment of the present invention.
Figure 3:
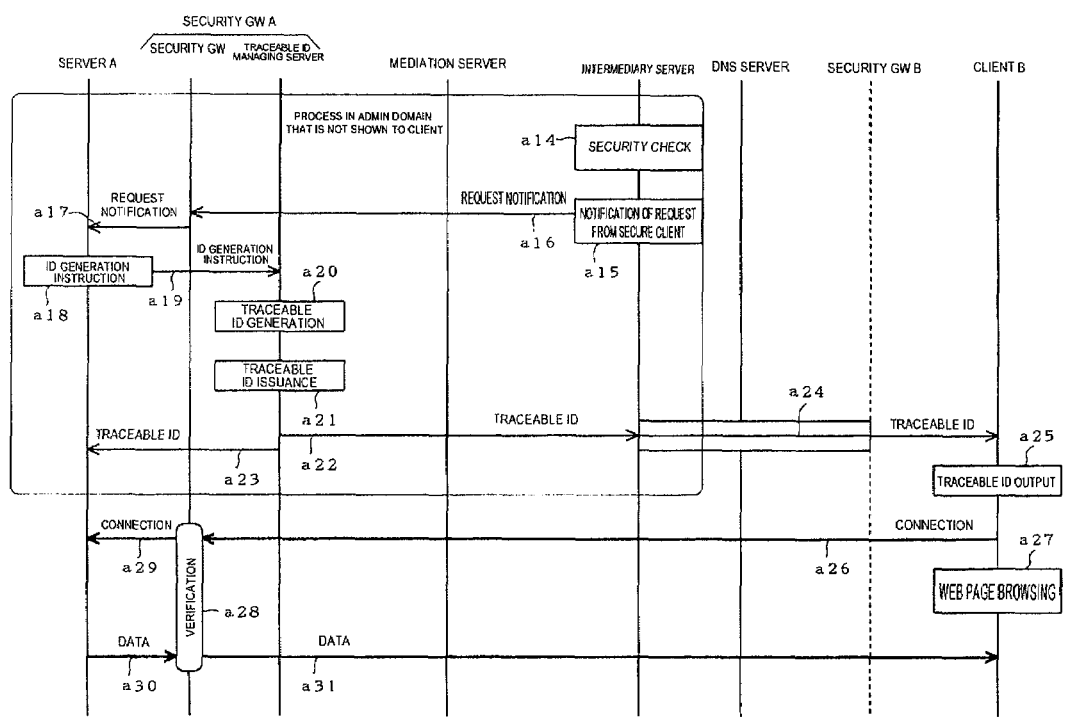
FIG. 3 is a sequence chart showing an operation of the communication system according to the first embodiment of the present invention.

FIGS. 2 and 3 are sequence charts of an operation of the communication system according to the first embodiment of the present invention. The operation of the communication system according to the first embodiment of the present invention will be described with reference to FIGS. 1 to 3. In this embodiment, before the operation of the communication system is started, address information (NID_IP) is pre-set in the mediation server 1 and a pair of node-representative ID (NID_FQDN) and address information (NID_IP) is pre-registered in the DNS server 5.

The client 42 (client B) starts communication (step a1 of FIG. 2) and outputs "node-representative ID (NID_FQDN)" to the DNS server 5 to retrieve address information (NID_IP) (steps a2 and a3 of FIG. 2). The DNS server 5 resolves an address on the basis of "node-representative ID (NID_FQDN)" (step a4 of FIG. 2) and sends the address information (NID_IP) as a result of the address resolving to the client 42 (client B) (step a5 of FIG. 2). The client 42 (client B) transmits a connection request to the mediation server 1 through the security gateway 41 (security gateway B) on the basis of the address information (NID_IP) acquired from the DNS server 5 (steps a6 and a7 of FIG. 2).

The mediation server 1 checks a source address for the connection request from the client 42 (client B) (step a8 of FIG. 2), and reports an intermediary server ID of the intermediary server ID holding unit 12 to the client 42 (client B) when the check is OK (steps a9 and a10 of FIG. 2). At this time, the mediation server 1 notifies the intermediary server 2 of the fact that access from the client (client B) exists (step a11 of FIG. 2).

The client 42 (client B) receives the intermediary server ID from the mediation server 1 through the security gateway 41 (security gateway B), and sends the connection request to the intermediary server 2 through the security gateway 41 (security gateway B) (step a13 of FIG. 2) when the intermediary server ID is input (step a12 of FIG. 2).

When the connection request is received from the client (client B), the intermediary server 2 performs the security check of whether each of the server 34 (server A) and the client 42 (client B) is connected by a reliable path or belongs to the reliable sites 100 and 200 (step a14 of FIG. 3). When each of the server 34 (server A) and the client 42 (client B) is connected by the reliable path or belongs to the reliable sites 100 and 200, the intermediary server 2 notifies the security gateway 32 of the fact that the connection request from the secure client 42 (client B) exists (steps a15 and a16 of FIG. 3).

When the notification of the connection request from the client 42 (client B) is received, the security gateway 32 sends the notification to the server 34 (server A) (step a11 of FIG. 3).

When the request notification is received from the security gateway 32, the server 34 (server A) instructs the traceable ID managing server 33 to generate the traceable ID (steps a18 and a19 of FIG. 3). When the ID generation instruction is received from the server 34 (server A), the traceable ID managing server 33 generates or reads the traceable ID (step a20 of FIG. 3) and issues the traceable ID to the client 42 (client B) (steps a21 and a22 of FIG. 3). At this time, the traceable ID managing server 32 issues the traceable ID to the server 34 (server A) (step a23 of FIG. 3).

The client 42 (client B) receives a traceable ID from the traceable ID managing server 33 through the intermediary server 2 and the security gateways 31 and 41 (security gateways A and B) and outputs the traceable ID (steps a24 and a25 of FIG. 3), and is connected by the server 34 (server A) (steps a26 and a29 of FIG. 3).

At this time, the security gateway 32 of the security gateway 31 (security gateway A) verifies the access to the server 34 (server A) through the reliable path established with the intermediary server 2 using the traceable ID (step a28 of FIG. 3). Thereafter, the client 42 (client B) starts web page browsing (step a27 of FIG. 3) and acquires and displays data by accessing the server 34 (server A) (steps a30 and a31 of FIG. 3). The process of steps a14 to a23 described above is that in an administration domain (Admin Domain), which is not shown to the client 42 (client B).

Figure 4:
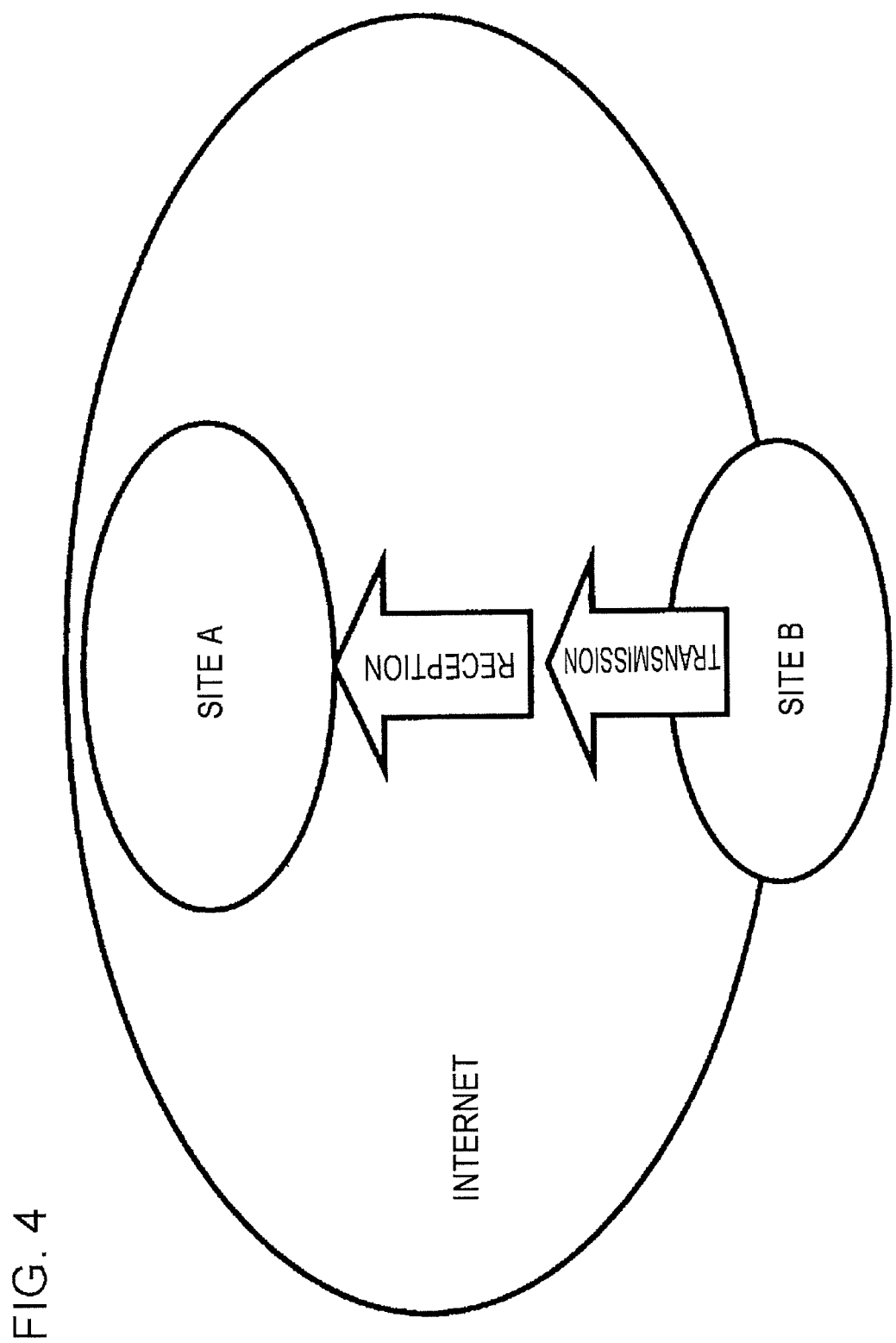
FIG. 4 is a diagram showing an application model of a reliable communication mechanism according to the first embodiment of the present invention.
Figure 5:
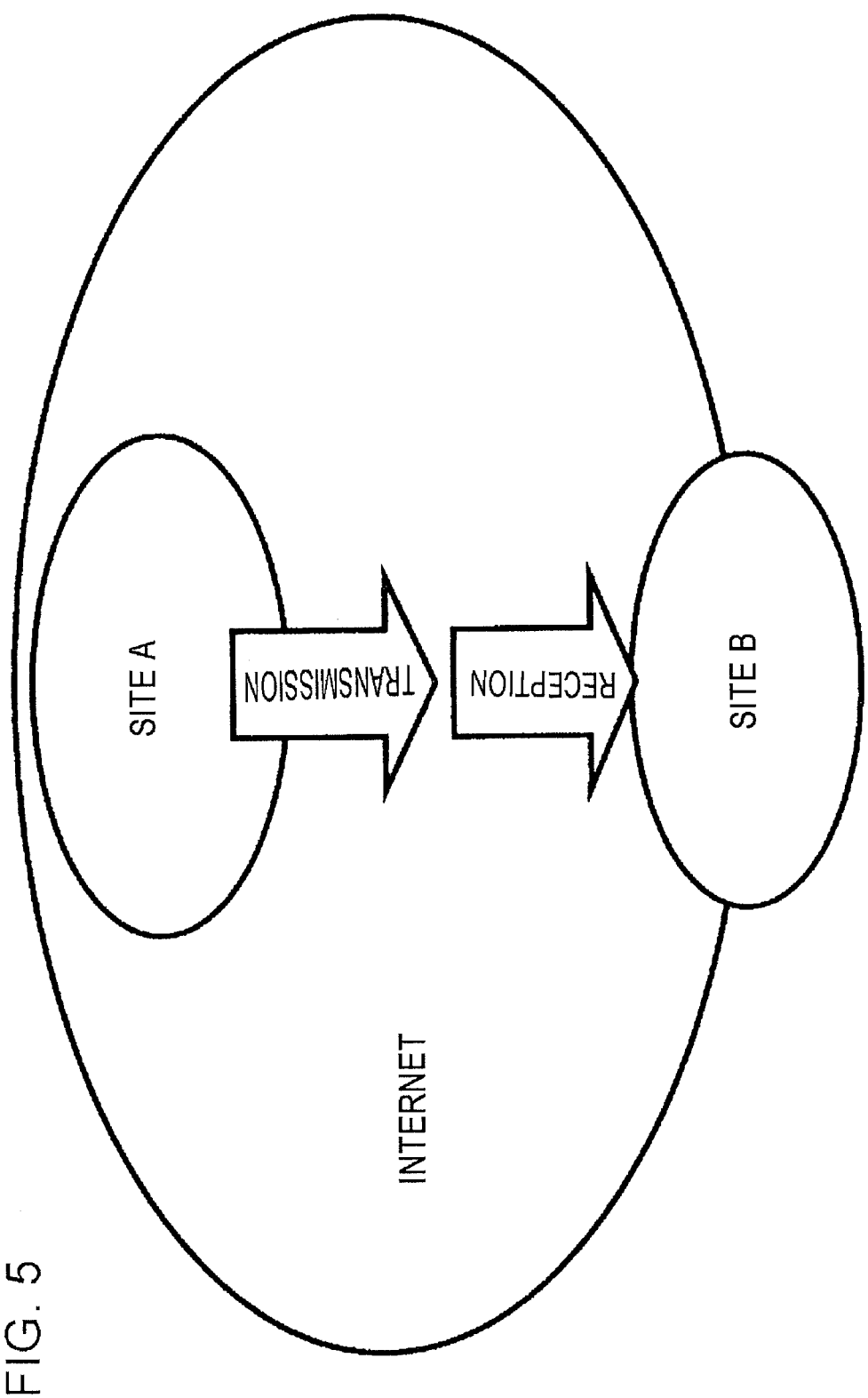
FIG. 5 is a diagram showing an application model of the reliable communication mechanism according to the first embodiment of the present invention.
Figure 6:
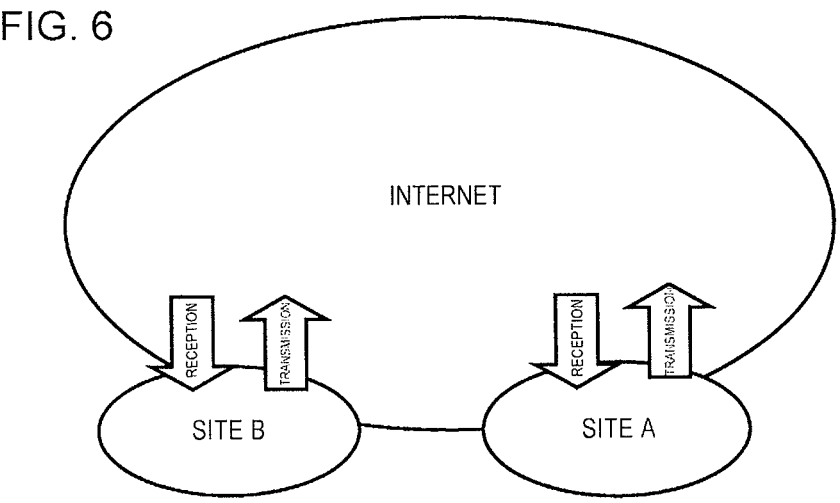
FIG. 6 is a diagram showing an application model of the reliable communication mechanism according to the first embodiment of the present invention.

FIGS. 4 to 6 are diagrams showing application models of the reliable communication mechanism according to the first embodiment of the present invention. FIG. 4 shows a center reception type model in which a signal is securely received from a user network to an internal network by the intermediary server 2 of the reliable communication mechanism. For example, only users contracting with a service provider may receive a signal from the service provider. This model may protect the server 34 (server A) from a DoS (Denial of Service) attack or the like.

FIG. 5 shows an edge reception type model in which a signal is securely received from the internal network to the user network by the intermediary server 2 of the reliable communication mechanism. For example, only an authorized entity may remotely access a home network of a user. This model is applicable to a secure push type service as well as to remote access by a user.

FIG. 6 shows a global access type model in which a network between users is securely connected through the intermediary server 2 of the reliable communication mechanism. For example, when associates (families living in a remote place or the like) configure a community, a network between users may be securely connected. In this model, unauthorized access may be prevented in advance and secure information sharing within a community is possible.

Figure 7:
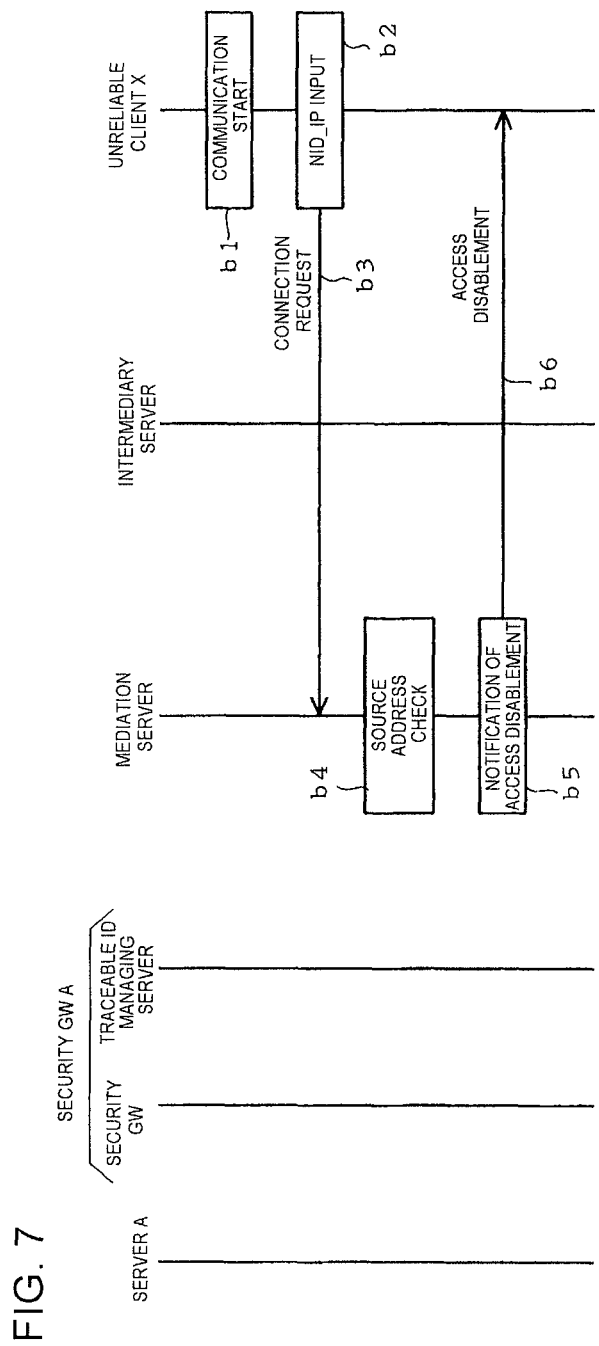
FIG. 7 is a sequence chart showing an attack prevention method in the communication system according to the first embodiment of the present invention.
Figure 8:
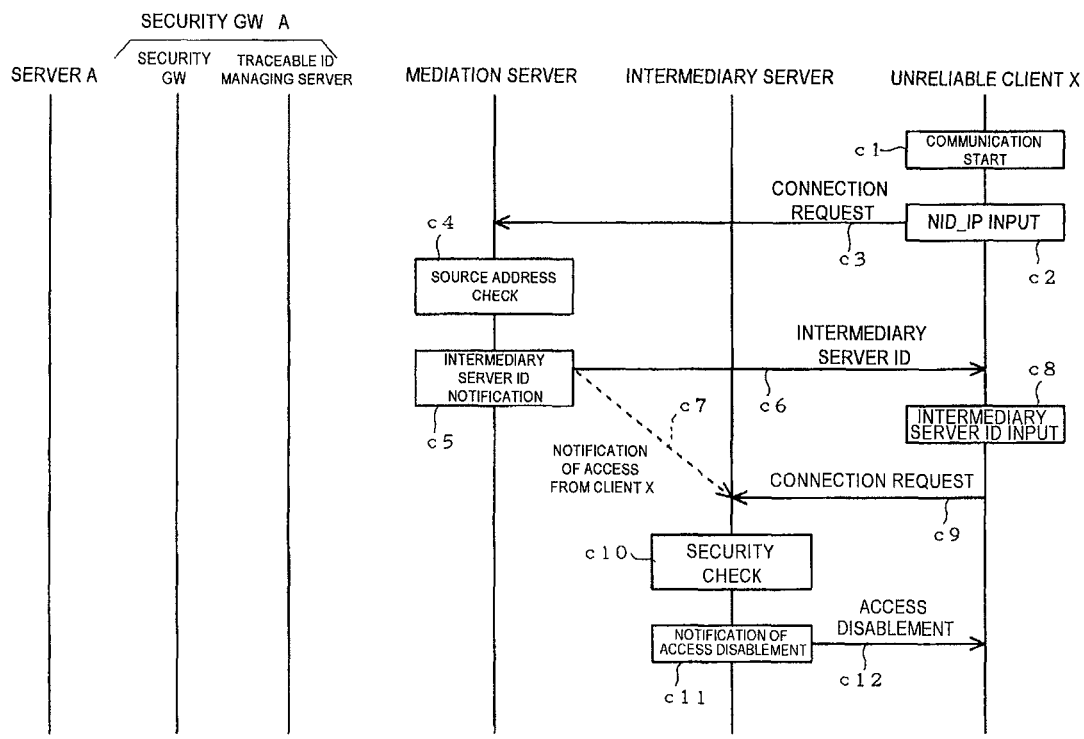
FIG. 8 is a sequence chart showing an attack prevention method in the communication system according to the first embodiment of the present invention.

FIGS. 7 and 8 are sequence charts showing an attack prevention method in the communication system according to the first embodiment of the present invention. A method of preventing an attack from the unreliable client 6 (client X) (malicious user terminal) to the server 34 (server A) will be described with reference to FIGS. 7 and 8.

When the unreliable client 6 (client X) performs unauthorized access or a DoS attack to the server 34 (server A) on the basis of leaked address information (NID_IP) or address information (NID_IP) obtained by resolving an address of a node-representative ID (NID_FQDN) (steps b1, b2, and b3 of FIG. 7), the mediation server 1 checks a source address added to a connection request from the client 6 (client X) (step b4 of FIG. 7), a communication connection is denied when the source address is out of a given address range set in advance (steps b5 and b6 of FIG. 7). Thereby, in this embodiment, the mediation server 1 may defend against the unauthorized access or DoS attack from the client 6 (client X).

When the unreliable client 6 (client X) performs the unauthorized access or DoS attack to the server 34 (server A) on the basis of leaked address information (NID_IP) or address information (NID_IP) obtained by resolving an address of a node-representative ID (NID_FQDN) (steps c1, c2, and c3 of FIG. 8), the mediation server 1 checks a source address added to a connection request from the client 6 (client X) (step c4 of FIG. 8), and provides the client 6 (client X) with the intermediary server ID information of the intermediary server ID holding unit 12 when the source address is in the given address range set in advance (steps c5 and c6 of FIG. 8). At this time, the mediation server 1 notifies the intermediary server 2 of the fact that access from the client 6 (client X) exists (step c7 of FIG. 8).

The client 6 (client X) receives an intermediary server ID from the mediation server 1, and sends a connection request to the intermediary server 2 (step c9 of FIG. 8) when the intermediary server ID is input (step c8 of FIG. 8). When the connection request is received from the client 6 (client X), the intermediary server 2 performs the security check of whether each of the server 34 (server A) and the client 6 (client X) is connected by a reliable path or belongs to the reliable sites 100 and 200 (step c10 of FIG. 8).

When the client 6 (client X) is not connected by the reliable path, or does not belong to the reliable sites 100 and 200, the intermediary server 2 denies access from the client 6 (client X) (steps c11 and c12 of FIG. 8).

Figure 9:
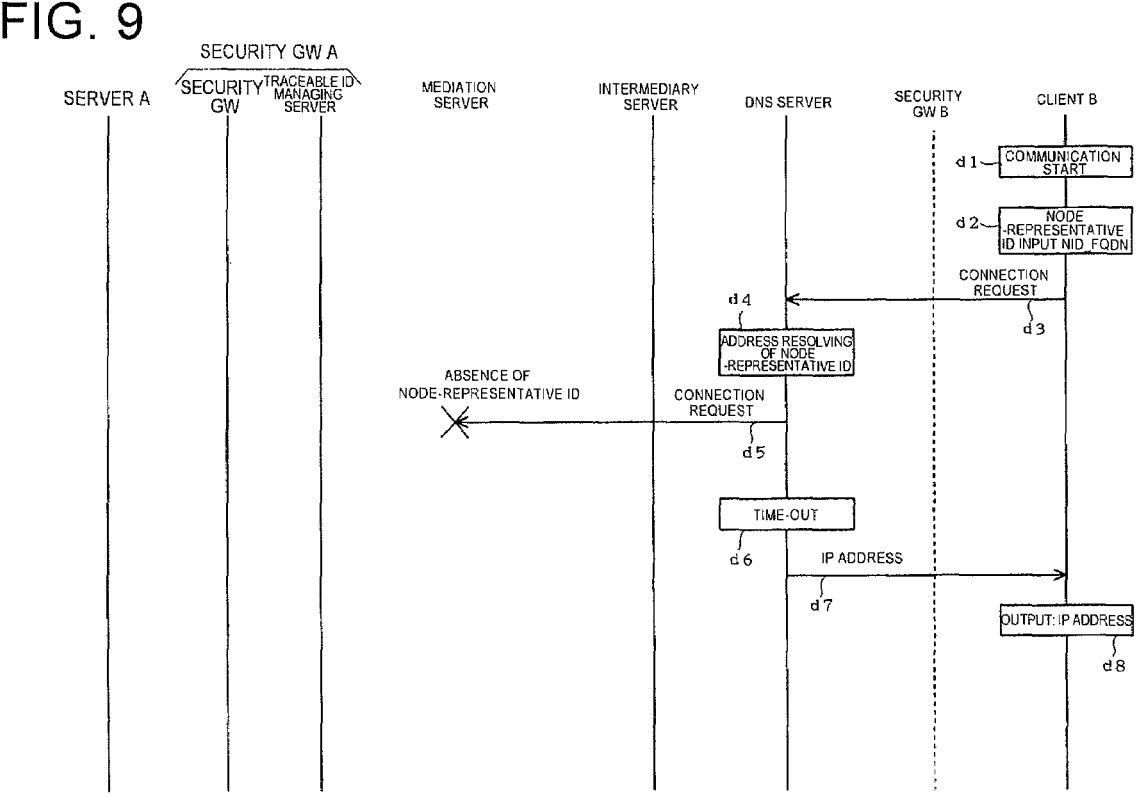
FIG. 9 is a sequence chart showing an operation of the communication system according to the first embodiment of the present invention.

FIG. 9 is a sequence chart showing an operation of the communication system according to the first embodiment of the present invention. In FIG. 9, there is shown a DNS process of the DNS server 5 when address information (NID_IP) corresponding to a node-representative ID (NID_FQDN) does not exist.

The client 42 (client B) starts communication (step d1 of FIG. 9) and outputs "node-representative ID (NID_FQDN)" to the DNS server 5 so as to retrieve the address information (NID_IP) (steps d2 and d3 of FIG. 9). The DNS server 5 resolves an address on the basis of "node-representative ID (NID_FQDN)" (step d4 of FIG. 9). When the address information (NID_IP) corresponding to the node-representative ID (NID_FQDN) does not exist as the address resolving result (step d5 of FIG. 9) and the DNS process is timed out (step d6 of FIG. 9), the DNS server 5 transmits an IP address obtained by executing a conventional DNS process to the client 42 (client B) (step d7 of FIG. 9). The client 42 (client B) outputs the IP address obtained from the DNS server 5 (step d8 of FIG. 9)

As such, in this embodiment, the reliable communication mechanism prevents a threat of a global access environment and performs the ID management of the network layer (for example, name resolving or ID generation/issuance/expiration), and the mediation server 1 receives unauthorized access or a DoS attack from a malicious user terminal (that is, the unreliable client 6 (client X)) on behalf of the server 34 (server A), so that communication with only reliable counterpart devices (that is, the server 34 (server A) and the client 42 (client B)) may be realized.

Thereby, in this embodiment, since the mediation server 1 receives communication from the client 42 (client B) or the malicious user terminal (that is, the unreliable client 6 (client X)) on behalf of the server 34 (server A), both problems of a threat to the site 100 and privacy leakage may be solved before arrival at the server 34 (server A) without conventionally performing reception at a border of the site 100.

In terms of a specific service for preventing the threat of this case, the reliable intermediary server 2 is responsible for a service of a carrier, the mediation server 1 (proxy device) is responsible for a service of an xSP (x Service Provider), and the security gateways 31 and 41 (security gateways A and B) are responsible for a service of an edge site.

In this embodiment, since the mediation server 1 and the intermediary server 2 receive an attack before the attack reaches the local site 100 without conventionally defending against the attack using Firewall or NAT (Network Address Translation) of the local site, the local site 100 is not directly affected even though the attack is made.

As such, this embodiment may realize the reliable communication architecture organizing a trust relationship without changing an AP (application) after protecting privacy information by an IP (Internet Protocol) layer. As a method of preventing an attack from an outside source in this reliable communication architecture, the attack is defended by the mediation server 1 and the intermediary server 2 before the attack from the outside source reaches the local site 100.

In terms of the influence on the local site 100 when the attack has been made in the reliable communication architecture, the local site 100 is not affected since the attack occurs in a place away from the local site 100. As recovery/measure when the attack has occurred in the reliable communication architecture, recovery may be easily performed when the mediation server 1 is stopped (unused), and a service may be continued by another mediation server. The above-described mediation server 1 or the other mediation server may be installed in a place (for example, a different city or town or a different country) away from the server 34 (server A).

As a method of awaiting access to the server 34 (server A) in the reliable communication architecture, a fixed address or a plurality of dynamic addresses is used which differs according to a counterpart, and access waits only when the access is predicted in the server 34 (server A) (when the presence of access from the intermediary server 2 is reported). In this case, privacy information of the local site 100 or the server 34 (server A) (that is, information indicating "Location Privacy": inner site information indicating where the local site 100 or the server 34 is located) is not leaked to an unspecified external counterpart.

That is, in this embodiment, the intermediary server 2 may perform authentication for the server 34 (server A) as well as authentication for the client 42 (client B) or the malicious user terminal (that is, the unreliable client (client X)). In this embodiment, a service by the mediation server 1 is like a hosting service realized in a state in which a main body of the server 34 (server A) is placed at home.

Second Embodiment

Figure 10:
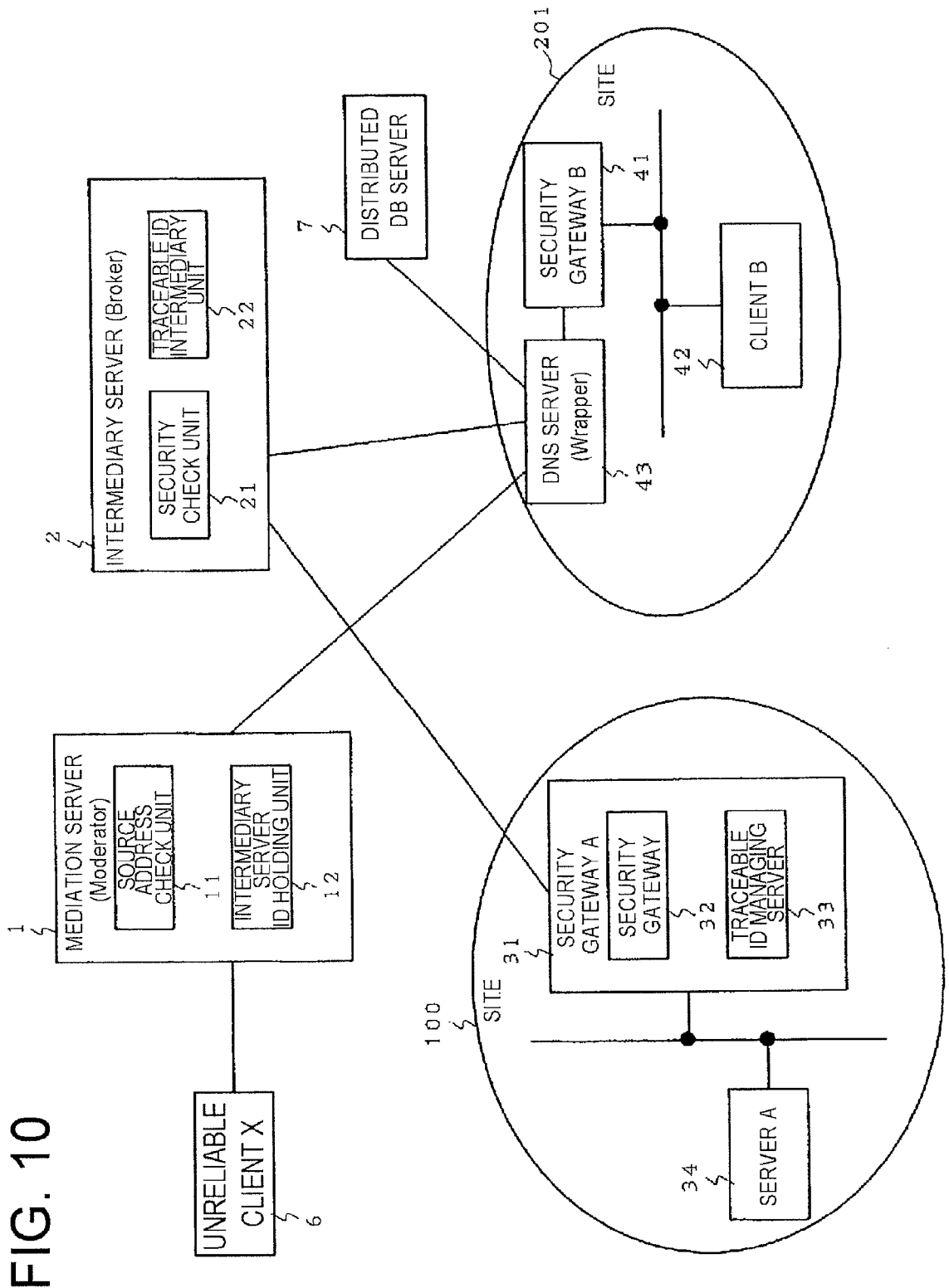
FIG. 10 is a block diagram showing a configuration of a communication system according to a second embodiment of the present invention.

FIG. 10 is a block diagram showing a configuration of the communication system according to the second embodiment of the present invention. In FIG. 10, the communication system according to the second embodiment of the present invention has the same configuration as the communication system according to the first embodiment of the present invention shown in FIG. 1, except that a DNS server (wrapper) 43 is installed within a site 201 of a security gateway 41 (security gateway B) and a client 42 (client B) and is connected by a distributed DB (Distributed Database) server 7 outside the site 201. In FIGS. 10 and 1, the same constituent elements are denoted by the same reference numerals as those of the first embodiment of the present invention. The operations of the same constituent elements are the same as those of the first embodiment of the present invention.

Here, private or unpublished address information in a DNS API (DNS Application Programming Interface) is registered to a database (not shown) of a DNS to be managed by the distributed DB server 7. The DNS server (wrapper) 43 is realized by a program group which controls access on the basis of the address information.

The first embodiment of the present invention described above uses an HTTP (Hyper Text Transfer Protocol) framework and is effective in communication using a web browser application. On the other hand, this embodiment uses a DNS framework and an application in communication using IP (Internet Protocol) is not limited.

The DNS server 43 receives a request of the client 42 (client B) and provides acquired traceable ID information for this client. In this case, the DNS server 43 retrieves address information (NID_IP) (resolves an address of a node-representative ID) on the basis of "node-representative ID (NID_FQDN)" received from the client 42 (client B), and acquires intermediary server ID information for the client from the mediation server 1 as a place where the retrieved address information (NID_IP) is received. The DNS server 43 acquires traceable ID information for the client from the intermediary server 2 of the acquired intermediary server ID address. When address information (NID_IP) corresponding to the node-representative ID (NID_FQDN) does not exist, the DNS server 43 executes a conventional DNS process.

The mediation server 1 receives communication to address information (NID_IP) from the DNS server 43 and provides the DNS server 43 with intermediary server ID information for the client. When a request from the DNS server 43 is received, the intermediary server 2 notifies the server 34 (server A) of the request through the security gateway 32 and provides the DNS server 43 with traceable ID information for the client generated from the traceable ID managing server 33 by an instruction from the server 34 (server A). The security gateway 32 verifies access to the server 34 (server A) by the traceable ID and the traceable ID managing server 33 generates or reads the traceable ID by an instruction from the server 34 (server A) and sends a response to the intermediary server 2.

In this embodiment, when the client 42 (client B) accesses the DNS server 43 so as to access the server 34 (server A), the DNS server 43 first resolves an address of a node-representative ID, accesses the mediation server 1 on the basis of an address resolving result, acquires an intermediary server ID, accesses the intermediary server 2 by the acquired intermediary server ID to acquire a traceable ID, and notifies the client 42 (client B) of the traceable ID. On the other hand, the unreliable client 6 (client X) does not have access by the check in the mediation server 1 or the intermediary server 2 as in the first embodiment of the present invention described above.

Figure 11:
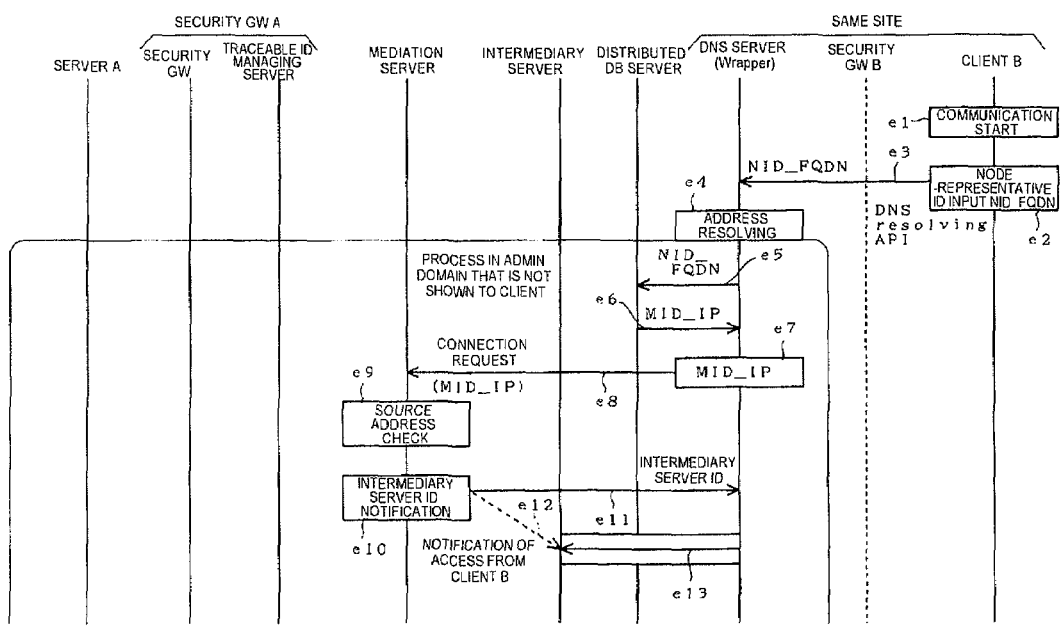
FIG. 11 is a sequence chart showing an operation of the communication system according to the second embodiment of the present invention.
Figure 12:
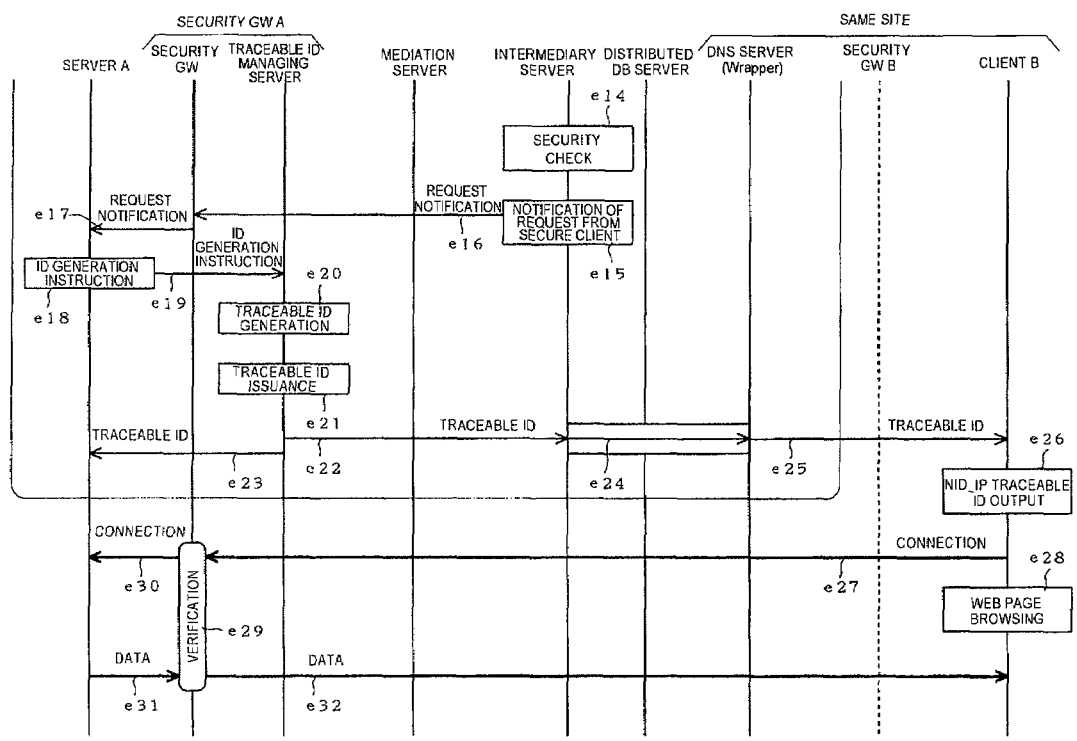
FIG. 12 is a sequence chart showing an operation of the communication system according to the second embodiment of the present invention.

FIGS. 11 and 12 are sequence charts showing an operation of the communication system according to the second embodiment of the present invention. The operation of the communication system according to the second embodiment of the present invention will be described with reference to FIGS. 10 to 12. In this embodiment, it is assumed that address information (MID_IP) is pre-set in the mediation server 1 and a pair of the node-representative ID (NID_FQDN) and address information (MID_IP) is pre-registered in the distributed DB server 7 before the operation is started.

The client 42 (client B) starts communication (step e1 of FIG. 11) and outputs "node-representative ID (NID_FQDN)" to the DNS server 43 so as to retrieve the address information (NID_IP) (steps e2 and e3 of FIG. 11). The DNS server 43 resolves an address on the basis of "node-representative ID (NID_FQDN)" (step e4 of FIG. 11) and acquires address information (MID_IP) by sending "node-representative ID (NID_FQDN) to the distributed DB server 7 (steps e5 and e6 of FIG. 11). The DNS server 43 transmits a connection request to the mediation server 1 on the basis of the acquired address information (MID_IP) (steps e7 and e8 of FIG. 11).

The mediation server 1 checks a source address of the client 42 (client B) in response to the connection request of the DNS server 43 (step e9 of FIG. 11), and notifies the DNS server 43 of an intermediary server ID of the intermediary server ID holding unit 12 when the check is OK (steps e10 and e11 of FIG. 11). At this time, the mediation server 1 notifies the intermediary server 2 of the fact that access from the client 42 (client B) exists (step e12 of FIG. 11).

When an intermediary server ID is received from the mediation server 1, the DNS server 43 sends the connection request to the intermediary server 2 on the basis of the intermediary server ID (step e13 of FIG. 11). When the connection request is received from the DNS server 43, the intermediary server 2 performs the security check of whether each of the server 34 (server A) and the client 42 (client B) is connected by a reliable path, or belongs to the reliable sites 100 and 200 (step e14 of FIG. 12).

When each of the server 34 (server A) and the client 42 (client B) is connected by the reliable path, or belongs to the reliable sites 100 and 200, the intermediary server 2 notifies the security gateway 32 of the connection request from the secure client 42 (client B) (steps e15 and e16 of FIG. 12).

When the notification of the connection request from the client 42 (client B) is received, the security gateway 32 sends the notification to the server 34 (server A) (step e11 of FIG. 12). When the request notification is received from the security gateway 32, the server 34 (server A) instructs the traceable ID managing server 33 to generate a traceable ID (steps e18 and e19 of FIG. 12).

When the ID generation instruction is received from the server 34 (server A), the traceable ID managing server 33 generates or reads the traceable ID (NID_IP) (step e20 of FIG. 12) and issues the traceable ID (NID_IP) to the DNS server 43 through the intermediary server 2 (steps e21, e22, and e24 of FIG. 12). At this time, the traceable ID managing server 32 also issues the traceable ID (NID_IP) to the server (server A) (step e23 of FIG. 12).

The DNS server 43 transmits the traceable ID (NID_IP) received through the intermediary server 2 to the client 42 (client B) (step e25 of FIG. 12). The client 42 (client B) receives the traceable ID (NID_IP) from the DNS server 43 through the security gateway 41 (security gateway B) and outputs the traceable ID (NID_IP) (step e26 of FIG. 12), and is connected by the server 34 (server A) (steps e27 and e30 of FIG. 12).

At this time, the security gateway 32 of the security gateway 31 (security gateway A) verifies the access to the server 34 (server A) through a reliable path established with the intermediary server 2 by the traceable ID (NID_IP) (step e29 of FIG. 12). Thereafter, the client 42 (client B) starts web page browsing (step a28 of FIG. 12) and acquires and displays data by accessing the server 34 (server A) (steps e31 and e32 of FIG. 12). The process of steps e5 to e24 described above is that in an administration domain (Admin Domain), which is not shown to the client 42 (client B).

As such, this embodiment may also achieve the same effect as the first embodiment of the present invention, except that the DNS server 43 within the same site 201 as that of the client 42 (client B) acquires a traceable ID (NID_IP) using the DNS framework and provides the client 42 (client B) with the traceable ID (NID_IP). That is, in this embodiment, the reliable communication mechanism prevents the threat of a global access environment and performs the ID management of the network layer (for example, name resolving or ID generation/issuance/expiration), and the mediation server 1 receives unauthorized access or a DoS attack from a malicious user terminal (that is, the unreliable client 6 (client X)) on behalf of the server 34 (server A), so that communication only with reliable counterpart devices may be realized.

In this embodiment, information accumulated in a database to be managed by the distributed DB server 7 retrieved by the DNS server 43 within the same site 201 as that of the client 42 (client B) is set to be private, that is, unpublished, thereby contributing to retention of users.

Third Embodiment

Figure 13:
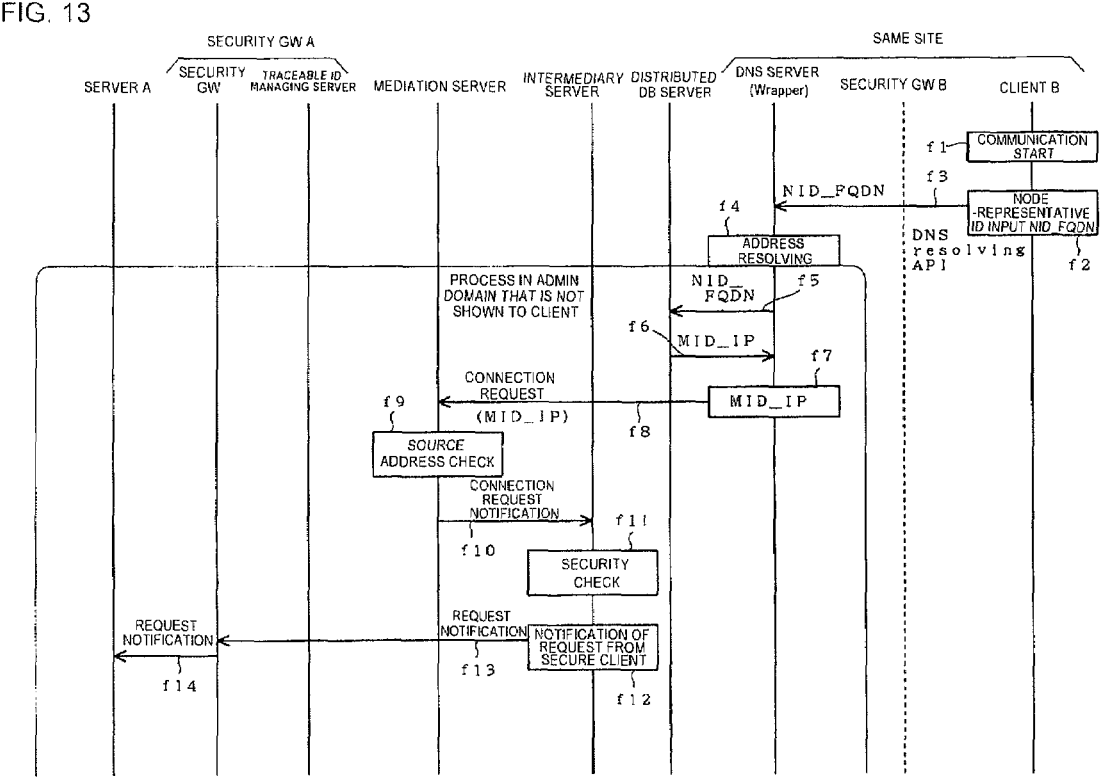
FIG. 13 is a sequence chart showing an operation of a communication system according to a third embodiment of the present invention.
Figure 14:
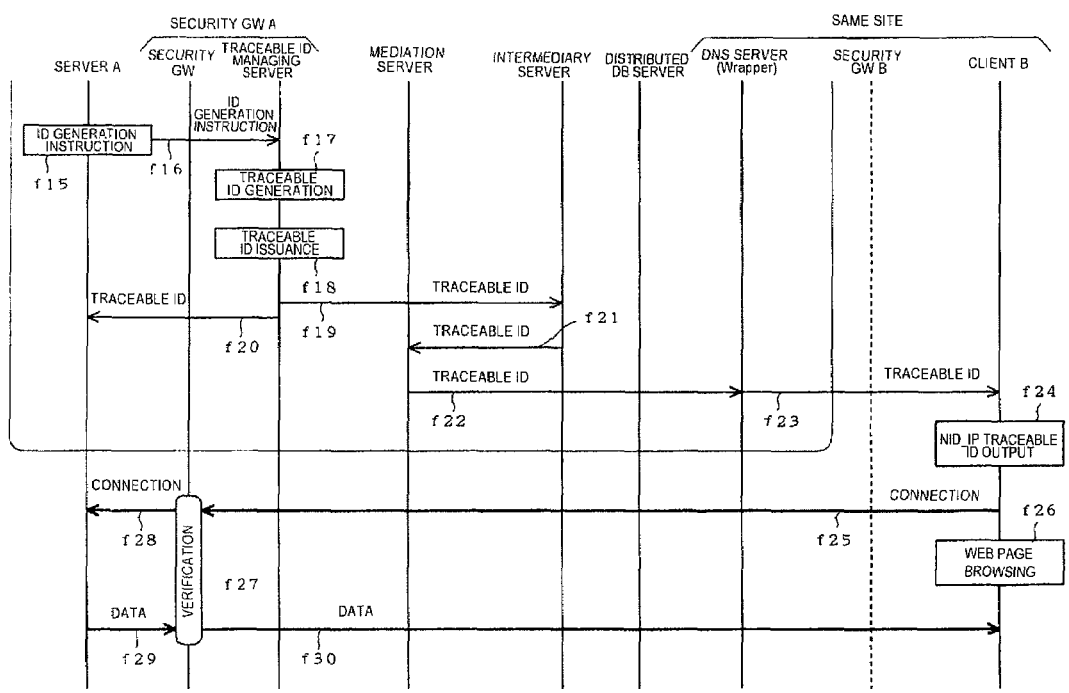
FIG. 14 is a sequence chart showing an operation of the communication system according to the third embodiment of the present invention.

FIGS. 13 and 14 are sequence charts showing an operation of a communication system according to a third embodiment of the present invention. The configuration of the communication system according to the third embodiment of the present invention is the same as that of the communication system according to the second embodiment shown in FIG. 10. The operation of the communication system according to the third embodiment of the present invention will be described with reference to FIGS. 10, 13, and 14. In this embodiment, it is assumed that address information (MID_IP) is pre-set in the mediation server 1 and a pair of the node-representative ID (NID_FQDN) and address information (MID_IP) is pre-registered in the distributed DB server 7 before the operation is started.

The client 42 (client B) starts communication (step f1 of FIG. 13) and outputs "node-representative ID (NID_FQDN)" to the DNS server 43 so as to retrieve the address information (NID_IP) (steps f2 and f3 of FIG. 13). The DNS server 43 resolves an address on the basis of "node-representative ID (NID_FQDN)" (step f4 of FIG. 13) and acquires address information (MID_IP) by sending "node-representative ID (NID_FQDN) to the distributed DB server 7 (steps f5 and f6 of FIG. 13). The DNS server 43 transmits a connection request to the mediation server 1 on the basis of the acquired address information (MID_IP) (steps f7 and f8 of FIG. 13).

The mediation server 1 checks a source address of the client 42 (client B) in response to the connection request of the DNS server 43 (step f9 of FIG. 13), and notifies the intermediary server 2 of the connection request on the basis of an intermediary server ID of the intermediary server ID holding unit 12 when the check is OK (step f10 of FIG. 13). When the connection request notification is received from the mediation server 1, the intermediary server 2 performs the security check of whether each of the server 34 (server A) and the client 42 (client B) is connected by a reliable path, or belongs to the reliable sites 100 and 200 (step f11 of FIG. 13)

When each of the server 34 (server A) and the client 42 (client B) is connected by the reliable path, or belongs to the reliable sites 100 and 200, the intermediary server 2 notifies the security gateway 32 of the connection request from the secure client 42 (client B) (steps f12 and f13 of FIG. 13).

When the notification of the connection request from the client 42 (client B) is received, the security gateway 32 sends the notification to the server 34 (server A) (step f14 of FIG. 13). When the request notification is received from the security gateway 32, the server 34 (server A) instructs the traceable ID managing server 33 to generate a traceable ID (steps f15 and f16 of FIG. 14).

When the ID generation instruction is received from the server 34 (server A), the traceable ID managing server 33 generates or reads the traceable ID (NID_IP) (step f17 of FIG.

14) and issues the traceable ID (NID_IP) to the mediation server 1 through the intermediary server 2 (steps f18, f19, and f21 of FIG. 14). At this time, the traceable ID managing server 32 also issues the traceable ID (NID_IP) to the server 34 (server A) (step f20 of FIG. 14).

The mediation server 1 transmits the traceable ID (NID_IP) received through the intermediary server 2 to the client 42 (client B) through the DNS server 43 (steps f22 and f23 of FIG. 14). The client 42 (client B) receives the traceable ID (NID_IP) from the DNS server 43 through the security gateway 41 (security gateway B) and outputs the traceable ID (NID_IP) (step f24 of FIG. 14), and is connected by the server 34 (server A) (steps f25 and f28 of FIG. 14).

At this time, the security gateway 32 of the security gateway 31 (security gateway A) verifies the access to the server 34 (server A) through a reliable path established with the intermediary server 2 by the traceable ID (NID_IP) (step f27 of FIG. 14). Thereafter, the client 42 (client B) starts web page browsing (step f26 of FIG. 14) and acquires and displays data by accessing the server 34 (server A) (steps f29 and f30 of FIG. 14). The process of steps f5 to f22 described above is that in an administration domain (Admin Domain), which is not shown to the client 42 (client B).

As such, this embodiment may also achieve the same effect as the first embodiment of the present invention, except that the DNS server 43 within the same site 201 as that of the client 42 (client B) acquires a traceable ID (NID_IP) through the mediation server 1 using the DNS framework and provides the client 42 (client B) with the traceable ID (NID_IP).

That is, in this embodiment, the reliable communication mechanism prevents a threat of a global access environment and performs the ID management of the network layer (for example, name resolving or ID generation/issuance/expiration), and the mediation server 1 receives unauthorized access or a DoS attack from a malicious user terminal (that is, the unreliable client 6 (client X)) on behalf of the server 34 (server A), so that communication with only reliable counterpart devices may be realized.

Since the mediation server 1 and the intermediary server 2 may be realized by running a program, the functions of the mediation server 1 and the intermediary server 2 may be embedded in one unit. When the mediation server 1 receives an attack from a malicious user terminal and is replaced with another mediation server, the replacement may be realized only by changing a program.

The present invention is applicable to a NGN (Next Generation Network) or an IPv6 (Internet Protocol version 6) network.

While the present invention has been described with reference to exemplary embodiments thereof, the invention is not limited to these embodiments. It may be made various changes in the form and details that understood by those of ordinary skill in the art without departing from the scope of the present invention.

This application is based upon and claims the benefit of priority from Japanese Patent Application No. 2007-058018, filed on Mar. 8, 2007, the disclosure of which is incorporated herein in its entirety by reference.

The invention claimed is:

1. A communication system comprising:
a DNS (Domain Name System) server which extracts or acquires, when access has been generated using a FQDN (Fully Qualified Domain Name) for accessing from a user terminal to a service providing sever, an IP (Internet Protocol) address corresponding to said FQDN, and transmits the IP address to said user terminal or performs access using the IP address;
a mediation server device which first receives, when the access using the said IP address corresponding to said FQDN has been generated from said user terminal or said DNS server, the access on behalf of said service providing server, and performs first authentication for said user terminal;
an intermediary server device which performs second authentication for the user terminal identified as a reliable terminal in said first authentication by said mediation server device;
a traceable ID managing server which generates an IP address as a traceable private ID capable of specifying a transmission source by a destination address in correspondence with the user terminal identified as a reliable terminal in said second authentication by said intermediary server device; and
a security gateway device which belongs to the same site as that of said service providing server,
wherein said mediation server device provides an intermediary server device ID for connecting to said intermediary server device to said user terminal or said DNS server that has performed said access using said IP address corresponding to said FQDN when said user terminal has been identified as the reliable terminal in said first authentication,
said intermediary server device transmits a notification indicating that access from the reliable terminal has been generated to said service providing server through said security gateway device when the user terminal has been identified as the reliable terminal in said second authentication,
said service providing server instructs said traceable ID managing server to generate a traceable private ID upon receipt of said notification indicating that there is a connection request from the user terminal identified as the reliable terminal in said second authentication, so that said traceable ID managing server receiving the instruction generates and transmits the traceable private ID to the user terminal and said service providing server, and
said security gateway device verifies that the access is access to said service providing server through a reliable path by said traceable private ID when access using said traceable private ID is generated from said user terminal, so that said service providing server provides a service to said user terminal,
wherein said second authentication is authentication for said user terminal and said server, and is performed by at least authenticating a communication path of which security has been identified between said user terminal and said server.

2. The communication system according to claim 1, wherein said communication path of which the security has been identified is checked by performing at least authentication for a subscriber line between said user terminal and said server and authentication for a VPN (Virtual Private Network).

3. A communication method comprising:
extracting or acquiring, by a DNS (Domain Name System) server, when access has been generated using a FQDN (Fully Qualified Domain Name) for accessing from a user terminal to a service providing sever, an IP (Internet Protocol) address corresponding to said FQDN,
transmitting, by said DNS server, the IP address to said user terminal or performing access using the IP address;
first receiving, by a mediation server, when the access using the said IP address corresponding to said FQDN has been generated from said user terminal or said DNS server, the access on behalf of said service providing server, performing first authentication for said user terminal, and providing an intermediary server ID for connecting to a intermediary server to said user terminal or said DNS server that has performed said access using said IP address corresponding to said FQDN when said user terminal has been identified as the reliable terminal in said first authentication;

performing, by said intermediary server, second authentication for the user terminal identified as a reliable terminal in said first authentication by said mediation server, and transmitting a notification indicating that access from the reliable terminal has been generated to said service providing server through a security gateway belonging to the same site as that of said service providing server when the user terminal has been identified as the reliable terminal in said second authentication;

instructing, by said service providing server, a traceable ID managing server to generate a traceable private ID upon receipt of said notification indicating that there is a connection request from the user terminal identified as the reliable terminal in said second authentication;

generating, by said traceable ID managing server, an IP address as a traceable private ID capable of specifying a transmission source by a destination address in correspondence with the user terminal identified as a reliable terminal in said second authentication by said intermediary server upon receipt of the instruction from said service providing server and transmitting the traceable private ID to the user terminal and said service providing server;

verifying, by said security gateway, that the access is access to said service providing server through a reliable path by said traceable private ID when access using said traceable private ID is generated from said user terminal; and providing, by said service providing server, a service to said user terminal wherein said second authentication is authentication for said user terminal and said server, and is performed by at least authenticating a communication path of which security has been identified between said user terminal and said server.

4. The communication method according to claim 3, wherein said communication path of which the security has been identified is checked by performing at least authentication for a subscriber line between said user terminal and said server and authentication for a VPN (Virtual Private Network).

* * * * *

UNITED STATES PATENT AND TRADEMARK OFFICE
CERTIFICATE OF CORRECTION

PATENT NO.        : 8,510,822 B2
APPLICATION NO.   : 12/530440
DATED             : August 13, 2013
INVENTOR(S)       : Hiroshi Kitamura and Shigeyoshi Shima It is certified that error appears in the above-identified patent and that said Letters Patent is hereby corrected as shown below:

In the Specification

Column 6, Line 47: Before "(client B)" insert -- 42 --

Column 6, Line 55: After "client" insert -- 42 --

Column 9, Line 46: After "client" insert -- 6 --

Column 11, Line 12: Delete "ell" and insert -- e11 --

Column 11, Line 31: Delete "ell" and insert -- e17 --

Column 11, Line 42: After "server" insert -- 34 --

Signed and Sealed this
Fourth Day of November, 2014

Michelle K. Lee
*Deputy Director of the United States Patent and Trademark Office*